US009450736B2

(12) United States Patent
Tang et al.

(10) Patent No.: US 9,450,736 B2
(45) Date of Patent: Sep. 20, 2016

(54) CODE CHANNEL ACTIVATION METHOD AND DEVICE, COMPUTER PROGRAM AND STORAGE MEDIUM

(75) Inventors: Zhixun Tang, Beijing (CN); Liang Zhuang, Beijing (CN)

(73) Assignee: ST-ERICSSON SEMICONDUCTOR (BEIJING) CO., LTD, Beijing (CN)

( * ) Notice: Subject to any disclaimer, the term of this patent is extended or adjusted under 35 U.S.C. 154(b) by 266 days.

(21) Appl. No.: 14/113,466

(22) PCT Filed: Apr. 17, 2012

(86) PCT No.: PCT/CN2012/074172
§ 371 (c)(1),
(2), (4) Date: Oct. 23, 2013

(87) PCT Pub. No.: WO2012/146140
PCT Pub. Date: Nov. 1, 2012

(65) Prior Publication Data
US 2014/0044103 A1    Feb. 13, 2014

(30) Foreign Application Priority Data
Apr. 28, 2011    (CN) .......................... 2011 1 0108891

(51) Int. Cl.
*H04B 7/216*    (2006.01)
*H04L 27/28*    (2006.01)
(Continued)

(52) U.S. Cl.
CPC ........... *H04L 5/0073* (2013.01); *H04B 1/7103* (2013.01); *H04J 13/0003* (2013.01); *H04J 13/004* (2013.01)

(58) Field of Classification Search
USPC ................. 370/335, 342, 441; 375/147–150, 375/339–343
See application file for complete search history.

(56) References Cited

U.S. PATENT DOCUMENTS 5,159,608 A * 10/1992 Falconer ............... H03M 13/23
375/130
5,257,257 A * 10/1993 Chen ..................... H04L 12/407
370/203
(Continued)

FOREIGN PATENT DOCUMENTS

CN         1753322 A      3/2006
CN       101064902 A     10/2007
(Continued)

OTHER PUBLICATIONS

Chinese Search Report in related Chinese Application No. CN201110108891.9 dated Apr. 28, 2011.
(Continued)

*Primary Examiner* — Thai Hoang
(74) *Attorney, Agent, or Firm* — Patent Portfolio Builders PLLC (57) ABSTRACT

The present invention provides a code channel activation method, a code channel activation device, a computer program and a storage medium, so as to solve the problem in the prior art that performance loss of a receiver will be caused when performing code channel activation. The method comprises calculating correlation between interference code channels on which code channel activation is to be performed and a user code channel, and correlation between the user code channels, to obtain correlation results; and performing code channel activation according to the correlation results. According to the present invention, the code channel activation is performed according to the correlation between the code channels. As a result, it is able to reserve the code channels with more information, thereby to prevent the performance loss of the receiver.

18 Claims, 2 Drawing Sheets

---

┌─ 101
Calculating correlation between a interference code channel within a first window and two user code channels, and correlation between the two user code channels ┌─ 102
Performing code channel activation according to the correlation results (51) Int. Cl.
  *H04L 5/00* (2006.01)
  *H04B 1/7103* (2011.01)
  *H04J 13/00* (2011.01)

(56) References Cited

U.S. PATENT DOCUMENTS

| | | | |
|---|---|---|---|
| 2002/0154680 A1* | 10/2002 | Hao | H04B 1/707 375/141 |
| 2002/0172181 A1* | 11/2002 | Sayeed | H04B 7/2634 370/342 |
| 2003/0039230 A1* | 2/2003 | Ostman | H04W 28/18 370/335 |
| 2005/0002467 A1* | 1/2005 | Seo | H04B 7/0634 375/267 |
| 2005/0111408 A1* | 5/2005 | Skillermark | H04B 1/7105 370/331 |
| 2006/0141933 A1 | 6/2006 | Smee et al. | |
| 2007/0177874 A1* | 8/2007 | Kashima | H04J 14/02 398/77 |
| 2008/0273511 A1* | 11/2008 | Wang | H04B 1/7105 370/342 |
| 2010/0278219 A1* | 11/2010 | Yu | H04B 1/7103 375/148 |
| 2014/0226633 A1* | 8/2014 | Tang | H04B 1/707 370/335 |
| 2015/0043525 A1* | 2/2015 | Jiang | H04L 1/06 370/330 |

FOREIGN PATENT DOCUMENTS

| | | |
|---|---|---|
| CN | 101335540 A | 12/2008 |
| CN | 101640549 A | 2/2010 |
| CN | 102185631 A | 9/2011 |
| KR | 100765369 A | 10/2001 |

OTHER PUBLICATIONS

First Chinese Office Action in related Chinese Application No. CN201110108891.9 dated Feb. 25, 2013.
Second Chinese Office Action in related Chinese Application No. CN201110108891.9 dated Oct. 22, 2013.
International Search Report issued in corresponding International patent application No. PCT/CN2012/074172, date of mailing Jul. 26, 2012.
International Preliminary Report on Patentability/Written Opinion of the International Searching Authority issued on corresponding International patent application No. PCT/CN2012/074172, date of mailing Jul. 26, 2012.

* cited by examiner

CODE CHANNEL ACTIVATION METHOD AND DEVICE, COMPUTER PROGRAM AND STORAGE MEDIUM

TECHNICAL FIELD

The present invention relates to the field of communication technology, in particular to a code channel activation method, a code channel activation device, a computer program and a storage medium.

BACKGROUND

In a CDMA (Code-Division Multiple Access) wireless communication system, adjacent cells may have an identical carrier frequency point so as to save frequency resources and improve the throughput of the system.

In this system, because a current cell has the same carrier frequency as an adjacent cell, a signal of the adjacent cell may be introduced into the current cell when passing through a RF section of a terminal, and it will interfere with a useful signal of the current cell. At this time, it needs to perform code channel activation.

Taking a TD-SCDMA wireless communication system as an example, in an existing coherent demodulation wireless communication system, when a signal received by the terminal is mixed with an intra-frequency signal of the adjacent cell, both an interference code channel and a user code channel will be introduced into a detector for joint detection. When the total number of the code channels exceeds the capacity of the detector, it will perform code channel activation and discard some of the code channels, so as to ensure that the total number of the code channels does not exceed the capacity of the detector, thereby to perform matching filtering and equalizing.

However, currently the code channels are selected according to the power of the code channels, rather than the other features. As a result, some code channels with more information may be discarded, which results in performance loss of a receiver.

SUMMARY

An object of the present invention is to provide a code channel activation method, a code channel activation device, a computer program and a storage medium so as to solve the problem in the prior art that performance loss of a receiver will be caused when performing code channel activation.

In one aspect, the present invention provides a code channel activation method, comprising:

calculating correlation between interference code channels on which code channel activation is to be performed and a user code channel, and correlation between the user code channels, to obtain correlation results; and performing code channel activation according to the correlation results, reserving the code channels of the first kind and discarding the code channels of the second kind; wherein the code channels of the first kind including more information that the code channels of the second code channel.

In another aspect, the present invention further provides a code channel activation device, comprising:

a correlation calculation module, configured to calculate correlation between interference code channels on which code channel activation is to be performed and a user code channel and correlation between the user code channels; and a code channel activation module configured to perform code channel activation according to the correlation results, reserve the code channels of the first kind and discard the code channels of the second kind, wherein the code channels of the first kind including more information than the code channels of the second kind.

According to the present invention, the code channel activation is performed according to the correlation between the code channels. As a result, it is able to reserve the code channels with more information, thereby to prevent the performance loss of the receiver.

DETAILED DESCRIPTION

The present invention is described hereinafter in conjunction with the drawings. The first embodiment of the present invention provides a code channel activation method. In this embodiment, a TD-SCDMA system is taken as an example, and the basic method and device for it may also be used for all DS-CDMA systems. To facilitate the understanding, the parameters are given in Table 1.

TABLE 1

| Communication system | TD-SCDMA |
|---|---|
| Number of cells | 2 |
| Midamble No. | 52, 97 |
| Modulation mode | QPSK |
| Spreading factor | 16 |
| Kcell | 8 |
| Number of Tx antennae | 1 |
| Number of Rx antennae | 1 |
| Number of code channels | current cell: 2 |
| | adjacent cell: 16 |
| Code channel No. | current cell: 1, 2 |
| | adjacent cell: 1~16 |
| Number of timeslots | 1 |

Figure 1:
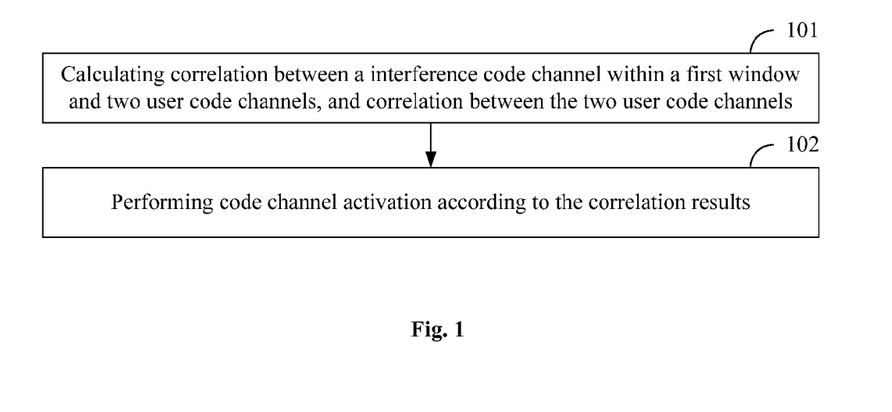
FIG. 1 is a flow chart of a code channel activation method according to a first embodiment of the present invention.

As shown in FIG. 1, the present invention provides a code channel activation method, comprising:

Step 101: calculating correlation between a first interference code channel within a window and two user code channels, and correlation between the two user code channels; and Step 102: performing code channel activation according to the correlation results.

In Step 101, the first interference code channel may be used as the interference code channel on which the code channel activation is to be performed, and so does a second interference code channel or the others. Of course, for a TD-SCDMA system, all the interference code channels in a window are used as the interference code channels on which the code channel activation is to be performed. In this embodiment, there are 8 windows. Two interference code channels are located within one window, e.g., the first and second interference code channels are located within the same window.

To facilitate the implementation, the correlation between all the code channels (including 16 interference code channels and 2 user code channels received by a terminal) and the 2 user code channels is generated at first. During the implementation, it needs to generate combined channel impulse responses for all the k (k=1, 2, . . . , 18) code channels. The combined channel impulse response for the $k^{th}$ code channel is calculated by the equation:

$$b^{(k)} = \left(b_1^{(k)}, b_2^{(k)}, \ldots, b_{Q+W-1}^{(k)}\right)$$
$$= (c^{(k)} \cdot {}^*m^{(k)}) \otimes h^{(k)}$$
$$= \left(\left(c_1^{(k)}, c_2^{(k)}, \ldots, c_Q^{(k)}\right) \cdot {}^*\left(m_1^{(k)}, m_2^{(k)}, \ldots, m_Q^{(k)}\right)\right) \otimes$$
$$\left(h_1^{(k)}, h_2^{(k)}, \ldots, h_w^{(k)}\right)$$

wherein $b^{(k)}$ represents the combined channel impulse response of the $k^{th}$ code channel in all the code channels consisting of the interference code channels and the user code channels received by the terminal, k is an integer and k=1, 2, . . . , $N_{users}$+1, $N_{users}$+2, . . . , $CH_v$, $N_{users}$ represents the number of user code channels, $CH_v$ represents the total number of the code channels, $c^{(k)}$ represents a spreading code corresponding to the $k^{th}$ code channel, $m^{(k)}$ represents a scrambling code corresponding to the $k^{th}$ code channel, $h^{(k)}$ represents the channel impulse response corresponding to the $k^{th}$ code channel, .* represents a symbol for point multiplication, $\otimes$ represents a symbol for linear convolution, Q represents a spreading factor, and W represents a window length for the channel impulse response.

The correlation between the 18 code channels and the 2 user code channels is calculated according to the generated combined channel impulse responses for the 18 code channels (including the user code channels and the interference code channels), so as to generate a correlation matrix.

The code channels are selected according to the calculated correlation between the 18 code channels and the 2 user code channels, and then the code channel activation is performed, so as to obtain a more accurate demodulation result.

In this embodiment, the correlation matrix is generated as follows, when the number of the code channels in the current cell is defined as $N_{user}$=2 and the total number of the code channels is defined as $CH_v$=18, the correlation Cor(i, k) between the $i^{th}$ code channel in the $N_{user}$ code channels and the $k^{th}$ code channel in the $CH_v$ code channels is calculated by the following equation:

$$Cor(i,k) = abs(sum(b^{(i)} \cdot {}^*b^{(k)*})), (i=1,2, k=1,2,\ldots,18)$$

wherein sum(.) represents the operation for finding a sum of all elements of a vector, abs(.) represents the operation for finding an absolute value, and $b^{(i)}$ represents the combined channel impulse response for the $i^{th}$ code channel in the user code channels.

In this embodiment, the code channel activation is performed as follows, at first a sum AutoCorUser of the correlation between the 2 user code channels is calculated by the equation $$AutoCorUser = \left(\sum_{j=1}^{2} \sum_{i=1}^{2} Cor(i, j)\right) (j = 1, 2),$$

wherein Cor(i, j) represents the correlation between the $i^{th}$ user code channel and the $j^{th}$ user code channel in the user code channels.

Then, the correlation between the code channels within the $m^{th}$ (m=1, 2, . . . , 8) window and the 2 user code channels is calculated by the equation $$WinCor(m) = \sum_{l \in Win_m} \sum_{i=1}^{2} Cor(i, l),$$

wherein Cor(i,l) represents the correlation between the $i^{th}$ code user in the user code channels and the $l^{th}$ interference code channels in all the interference code channels.

And then, a threshold $\alpha$ is set, and when the $l^{th}$ (l= 3, 4, . . . , 18) code channel is located within the $m^{th}$ window, the code channel activation is performed according to the correlation by using the following equation:

$$b^{(l)} = \begin{cases} b^{(l)}(\text{the } l^{th} \text{ code channel is activated}) & WinCor(m)/2 > \alpha * AutoCorUser/2 \\ 0(\text{the } l^{th} \text{ code channel is not activated}) & WinCor(m)/2) <= \alpha * AutoCorUser/2 \end{cases}$$

That is to say, if WinCor(m)/CodeNum(m)> $\alpha$*AutoCorUser/$N_{user}$, the interference code channels within the $m^{th}$ window $win_m$ will be activated, and if WinCor(m)/CodeNum(m)<=$\alpha$*AutoCorUser/$N_{user}$, the interference code channels within the $m^{th}$ window $Win_m$ will not be activated. CodeNum(m) represents the number of the interference code channels within the $m^{th}$ window, wherein $\alpha$<1.

Of course, it is merely a preferred scheme for the TD-SCDMA system to perform the code channel activation according to the equation $$b^{(l)} = \begin{cases} b^{(l)}(\text{the } l^{th} \text{ code channel is activated}) & WinCor(m)/2 > \alpha * AutoCorUser/2 \\ 0(\text{the } l^{th} \text{ code channel is not activated}) & WinCor(m)/2) <= \alpha * AutoCorUser/2 \end{cases}$$

and for the other CDMA systems, the code channel activation will be performed according to $$\sum_{l=1}^{N_{users}} Cor(i, l) > \alpha * AutoCorUser/N_{user} \text{ and}$$

$$\sum_{l=1}^{N_{users}} Cor(i, l) <= \alpha * AutoCorUser/N_{user}.$$

Different from the aforementioned scheme where WinCor (m) is used as a first calculation result obtained according to the correlation result Cor(i,l) between the 2 user code channels, $$\sum_{l=1}^{N_{users}} Cor(i, l)$$

is used herein as the first calculation result obtained according to the correlation result Cor(i,l) between the 2 user code channels. Also, whether or not the interference code channel is activated may be judged according to $$\sum_{l=1}^{N_{users}} Cor(i, l) > \beta * AutoCorUser \text{ and}$$

$$\sum_{l=1}^{N_{users}} Cor(i, l) <= \beta * AutoCorUser,$$

wherein β is another threshold. Here, both AutoCorUser/ $N_{user}$ and AutoCorUser are a second calculation result obtained according to Cor(i, j). It can be seen that, a principle for judging whether or not the interference code channel is activated is that the interference code channel on which the code channel activation is to be performed will be activated when a ratio of the second calculation result to the first calculation result is greater than the threshold, and otherwise the interference code channel will not be activated.

After the code channel activation is performed according to the correlation results, the code channels of the first kind will be reserved and the code channels of the second kind will be discarded. The code channels of the first kind include more information than the code channels of the second kind.

A traditional code channel activation algorithm may also be used in the method of the present invention, and the code channel activation may be performed according to the correlation results and the power of each code channel. For example, when WinCor(m)/CodeNum(m)>α*AutoCorUser/ $N_{user}$ and the power of the interference code channel within the $m^{th}$ window $Win_m$, needs to be greater than the given power, the interference code channel within the $m^{th}$ window $Win_m$ will be activated.

Figure 2:
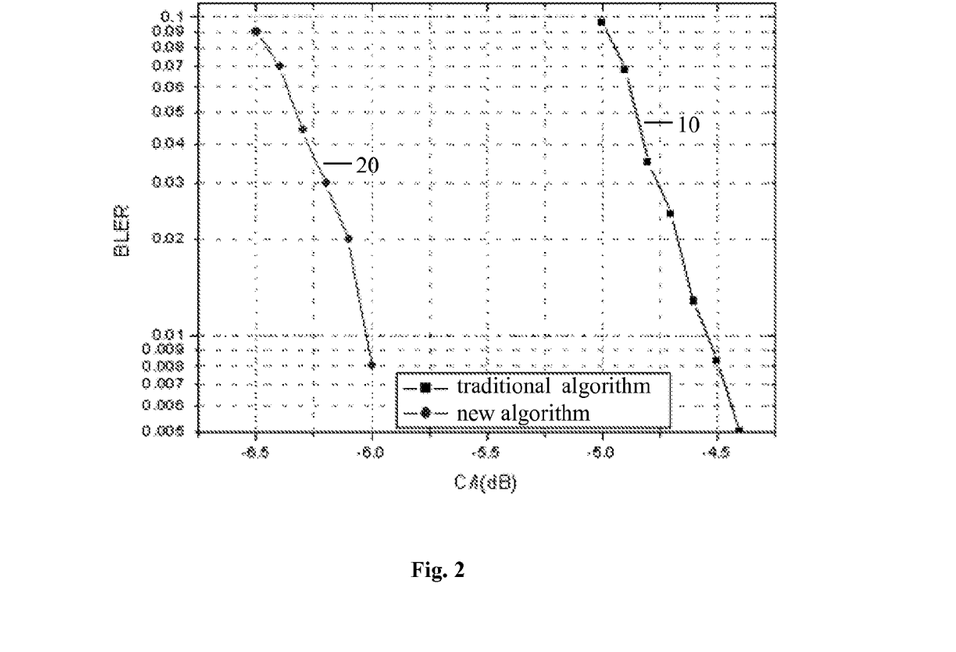
FIG. 2 is a schematic view showing a simulation result obtained according to an algorithm of the present invention.

FIG. 2 shows the simulation results under the abovementioned simulation configurations and channel environments. According to a simulation result 10 obtained by the traditional algorithm and a simulation result 20 obtained by the algorithm of the present invention, it is found that the algorithm of the present invention is less complex, and can obtain better performance, especially in a worse interference environment.

Figure 3:
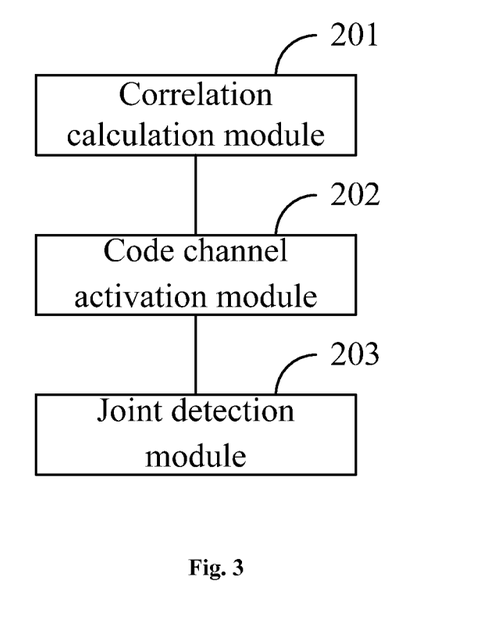
FIG. 3 is a schematic view showing a code channel activation device according to a second embodiment of the present invention.

As shown in FIG. 3, an embodiment of the present invention provides a code channel activation device, comprising:

a correlation calculation module 201, configured to calculate correlation between interference code channels on which code channel activation is to be performed and a user code channel, and correlation between the user code channels, to obtain correlation results; and a code channel activation module 202, configured to perform code channel activation according to the correlation results, reserve the code channels of the first kind and discard the code channels of the second kind, wherein the code channels of the first kind including more information than the code channels of the second kind.

Further, the correlation calculation module 201 is specifically configured to generate combined channel impulse responses for the interference code channels on which the code channel activation is to be performed and combined channel impulse responses for the user code channels, and calculate the correlation between the interference code channels on which the code channel activation is to be performed and the user code channel and the correlation between the user code channels according to the generated combined channel impulse responses.

The code channel activation module 202 is specifically configured to obtain a first calculation result according to the correlation between the user code channels, and a second calculation result according to the correlation between the interference code channels on which the code channel activation is to be performed and the user code channel, activate the interference code channels when a ratio of the second calculation result to the first calculation result is greater than a threshold, and otherwise, not activate the interference code channel.

The correlation calculation module 201 is specifically configured to generate the combined channel impulse responses for the interference code channels on which the code channel activation is to be performed and the combined channel impulse responses for the user code channels by using the following equation:

$$b^{(k)} = \left(b_1^{(k)}, b_2^{(k)}, \ldots, b_{Q+W-1}^{(k)}\right)$$
$$= (c^{(k)} .* m^{(k)}) \otimes h^{(k)}$$
$$= \left(\left(c_1^{(k)}, c_2^{(k)}, \ldots, c_Q^{(k)}\right) .* \left(m_1^{(k)}, m_2^{(k)}, \ldots, m_Q^{(k)}\right)\right) \otimes$$
$$\left(h_1^{(k)}, h_2^{(k)}, \ldots, h_W^{(k)}\right)$$

wherein $b^{(k)}$ represents the combined channel impulse response of the $k^{th}$ code channel in all the code channels consisting of the interference code channels and the user code channels received by the terminal, k is an integer and k=1, 2, . . . , $N_{user}$+1, $N_{users}$+2, $CH_v$, $N_{users}$ represents the number of user code channels, $CH_v$ represents the total number of the code channels, $c^{(k)}$ represents a spreading code corresponding to the $k^{th}$ code channel, $m^{(k)}$ represents a scrambling code corresponding to the $k^{th}$ code channel, $h^{(k)}$ represents the channel impulse response corresponding to the $k^{th}$ code channel, .* represents a symbol for point multiplication, ⊗ represents a symbol for linear convolution, Q represents a spreading factor, and W represents a window length for the channel impulse response.

Then, the correlation calculation module 201 is configured to calculate the correlation between the interference code channels on which the code channel activation is to be performed and the user code channel, and the correlation between the user code channels according to the generated combined channel impulse responses by using the following equation:

$$Cor(i,k)=abs(sum(b^{(i)}.*b^{(k)*})), i=1,2,\ldots,N_{users},$$

wherein Cor(i,k) represents the correlation between the $i^{th}$ code channel in the user code channels and the $k^{th}$ code channel in all the code channels, sum(.) represents the operation for finding a sum of all elements of a vector, abs(.) represents the operation for finding an absolute value, and $b^{(i)}$ represents the combined channel impulse response for the $i^{th}$ code channel in the user code channels.

The code channel activation module 202 is specifically configured to calculate a sum AutoCorUser of the correlation between the user code channels by using the equation $$AutoCorUser = \left(\sum_{j=1}^{N_{users}} \sum_{i=1}^{N_{users}} Cor(i,j)\right) \ (j=1,2,\ldots,N_{users}),$$

and use $AutoCorUser/N_{user}$ as a first calculation result, wherein $Cor(i,j)$ represents the correlation between the $i^{th}$ code channel and the $j^{th}$ code channel in the user code channels.

The code channel activation device further comprises a joint detection module 203 configured to perform joint detection on the activated code channels.

Further, the code channel activation module 202 is specifically configured to calculate the correlation WinCor(m) between the interference code channels within the $m^{th}$ window $Win_m$ and the user code channels by using the equation $$WinCor(m) = \sum_{l \in Win_m} \sum_{i=1}^{N_{users}} Cor(i,l),$$

use WinCor(m)/CodeNum(m) as a second calculation result, if WinCor(m)/CodeNum(m)>$\alpha$*AutoCorUser/$N_{user}$, activate the interference code channels within the $m^{th}$ window $Win_m$, and if WinCor(m)/CodeNum(m)<=$\alpha$*AutoCorUser/$N_{user}$, not activate the interference code channels within the $m^{th}$ window $Win_m$, wherein Cor(i, l) represents the correlation between the $i^{th}$ code channel in the user code channels and the $l^{th}$ code channel in all the interference code channels, CodeNum(m) represents the number of the interference code channels in the $m^{th}$ window, and a represents a given threshold.

Further, the code channel activation module 202 is specifically configured to perform the code channel activation according to the correlation results and the power of each code channel.

The above embodiments are merely for illustrative purpose, but shall not be construed as limiting the present invention. It should be noted that, a person skilled in the art may make further modifications or equivalent substitutions without departing from the spirit and principle of the present invention, and these modifications and substitutions shall also be considered as the scope of the present invention.

What is claimed is:

1. A code channel activation method, comprising:
 calculating correlations between a set of code channels and user code channels to obtain correlation results, wherein the set of code channels includes the user code channels and interference code channels; and
 performing code channel activation according to the correlation results, reserving code channels of a first kind and discarding code channels of a second kind;
 wherein the code channels of the first kind including more information than the code channels of the second code channel.

2. The code channel activation method according to claim 1, wherein
 the step of calculating correlations between the set of code channels and the user code channels comprises:
  generating combined channel impulse responses for the interference code channels on which code channel activation is to be performed and combined channel impulse responses for the user code channels; and
  calculating the correlations between the set of code channels and the user code channels according to the generated combined channel impulse responses, and
 the step of performing code channel activation according to the correlation results comprises:
  obtaining a first calculation result according to the correlation between the user code channels;
  obtaining a second calculation result according to the correlations between the set of code channels and the user code channels; and
  activating the interference code channels on which code channel activation is to be performed when a ratio of the second calculation result to the first calculation result is greater than a threshold, and otherwise, not activating the interference code channels on which code channel activation is to be performed.

3. The code channel activation method according to claim 2, wherein
 the step of generating combined channel impulse responses for the interference code channels on which code channel activation is to be performed and combined channel impulse responses for the user code channels comprises:
  generating the combined channel impulse responses for the interference code channels on which code channel activation is to be performed and the combined channel impulse responses for the user code channels by using an equation:

$$b^{(k)} = \left(b_1^{(k)}, b_2^{(k)}, \ldots, b_{Q+W-1}^{(k)}\right)$$
$$= (c^{(k)}.*m^{(k)}) \otimes h^{(k)}$$
$$= \left(\left(c_1^{(k)}, c_2^{(k)}, \ldots, c_Q^{(k)}\right).*\left(m_1^{(k)}, m_2^{(k)}, \ldots, m_Q^{(k)}\right)\right) \otimes$$
$$\left(h_1^{(k)}, h_2^{(k)}, \ldots, h_W^{(k)}\right)$$

wherein $b^{(k)}$ represents the combined channel impulse response of the $k^{th}$ code channel in all the code channels consisting of the interference code channels and the user code channels received by the terminal, k is an integer and k=1, 2, . . . , $N_{users}$+1, $N_{users}$+2, . . . , $CH_v$, $N_{users}$ represents the number of user code channels, $CH_v$ represents the total number of the code channels, $c^{(k)}$ represents a spreading code corresponding to the $k^{th}$ code channel, $m^{(k)}$ represents a scrambling code corresponding to the $k^{th}$ code channel, $h^{(k)}$ represents the channel impulse response corresponding to the $k^{th}$ code channel, .* represents a symbol for point multiplication, $\otimes$ represents a symbol for linear convolution, Q represents a spreading factor, and W represents a window length for the channel impulse response,
 the step of calculating the correlation between the interference code channels on which code channel activation is to be performed and the user code channel, and the correlation between the user code channels according to the generated combined channel impulse responses comprises:

calculating the correlation between the interference code channels on which code channel activation is to be performed and the user code channel, and the correlation between the user code channels according to the generated combined channel impulse responses by using an equation:

$$Cor(i,k) = abs(sum(b^{(i)} \cdot \ast b^{(k)\ast})), i = 1, 2, \ldots, N_{users}$$

wherein Cor(i,k) represents the correlation between the $i^{th}$ code channel in the user code channels and the $k^{th}$ code channel in all the code channels, sum(.) represents an operation for finding a sum of all elements of a vector, abs(.) represents an operation for finding an absolute value, and $b^{(i)}$ represents a combined channel impulse response for the $i^{th}$ code channel in the user code channels, and the step of obtaining a first calculation result according to the correlation between the user code channels comprises:
calculating a sum of the correlation between the user code channels by using an equation:

$$AutoCorUser = \left( \sum_{j=1}^{N_{users}} \sum_{i=1}^{N_{users}} Cor(i,j) \right) \quad (j = 1, 2, \ldots, N_{users})$$

and using $AutoCorUser/N_{user}$ as the first calculation result, wherein Cor(i, j) represents the correlation between the $i^{th}$ code channel and the $j^{th}$ code channel in the user code channels.

4. The code channel activation method according to claim 3, wherein subsequent to the code channel activation, the method further comprises:
performing joint detection on the activated code channels.

5. The code channel activation method according to claim 4, wherein
the step of obtaining a second calculation result according to the correlation between the interference code channels on which code channel activation is to be performed and the user code channel comprises:
calculating the correlation WinCor(m) between the interference code channels within the $m^{th}$ window $Win_m$ and the user code channels by using an equation:

$$WinCor(m) = \sum_{l \in Win_m} \sum_{i=1}^{N_{users}} Cor(i,l)$$

and using WinCor(m)/CodeNum(m) as the second calculation result,
wherein Cor(i,l) represents the correlation between the $i^{th}$ code channel in the user code channels and the $l^{th}$ code channel in all the interference code channels, and CodeNum(m) represents the number of the interference code channels in the $m^{th}$ window, and
the step of activating the interference code channels on which code channel activation is to be performed when a ratio of the second calculation result to the first calculation result is greater than a threshold, and otherwise, not activating the interference code channels on which code channel activation is to be performed comprises:

if WinCor(m)/CodeNum(m) > $\alpha$*AutoCorUser/$N_{user}$, activating the interference code channels within the $m^{th}$ window $Win_m$, and
if WinCor(m)/CodeNum(m) <= $\alpha$*AutoCorUser/$N_{user}$, not activating the interference code channels within the $m^{th}$ window $Win_m$,
wherein $\alpha$ represents a given threshold.

6. The code channel activation method according to claim 1, wherein the step of performing code channel activation according to the correlation results comprises:
performing code channel activation according to the correlation results and the power of each code channel.

7. A code channel activation device, comprising:
a correlation calculation module, configured to calculate correlations between a set of code channels and user code channels to obtain correlation results, wherein the set of code channels includes the user code; and
a code channel activation module, configured to perform code channel activation according to the correlation results, reserve code channels of a first kind and discard code channels of a second kind;
wherein the code channels of the first kind including more information than the code channels of the second kind.

8. The code channel activation device according to claim 7, wherein
the correlation calculation module is specifically configured to generate combined channel impulse responses for the interference code channels on which the code channel activation is to be performed and combined channel impulse responses for the user code channels, and calculate the correlations between the set of code channels and the user code channels according to the generated combined channel impulse responses, and
the code channel activation module is specifically configured to obtain a first calculation result according to the correlation between the user code channels, and a second calculation result according to the correlations between the set of code channels and the user code channels, activate the interference code channels when a ratio of the second calculation result to the first calculation result is greater than a threshold, and otherwise, not activate the interference code channel.

9. The code channel activation device according to claim 8, wherein
the correlation calculation module is specifically configured to
generate the combined channel impulse responses for the interference code channels on which the code channel activation is to be performed and the combined channel impulse responses for the user code channels by using an equation:

$$b^{(k)} = \left( b_1^{(k)}, b_2^{(k)}, \ldots, b_{Q+W-1}^{(k)} \right)$$
$$= (c^{(k)} \ast m^{(k)}) \otimes h^{(k)}$$
$$= \left( \left( c_1^{(k)}, c_2^{(k)}, \ldots, c_Q^{(k)} \right) \ast \left( m_1^{(k)}, m_2^{(k)}, \ldots, m_Q^{(k)} \right) \right) \otimes$$
$$\left( h_1^{(k)}, h_2^{(k)}, \ldots, h_W^{(k)} \right)$$

wherein $b^{(k)}$ represents the combined channel impulse response of the $k^{th}$ code channel in all the code channels consisting of the interference code channels and the user code channels received by the terminal, k is an integer and k=1, 2, . . . , $N_{users}$+1, $N_{users}$+2, . . . , $CH_v$, $N_{users}$ represents the number of user code channels, $CH_v$ represents the total number of the code channels, $c^{(k)}$ represents a spreading code corresponding to the $k^{th}$ code channel, $m^{(k)}$ represents a scrambling code corresponding to the $k^{th}$ code channel, $h^{(k)}$ represents the channel impulse response corresponding to the $k^{th}$ code channel, .* represents a symbol for point multiplication, $\otimes$ represents a symbol for linear convolution, Q represents a spreading factor, and W represents a window length for the channel impulse response; and calculate the correlation between the interference code channels on which the code channel activation is to be performed and the user code channel, and the correlation between the user code channels according to the generated combined channel impulse responses by using an equation:

$$Cor(i,k) = abs(sum(b^{(i)}.*b^{(k)*})), i=1,2,\ldots,N_{users}$$

wherein $Cor(i,k)$ represents the correlation between the $i^{th}$ code channel in the user code channels and the $k^{th}$ code channel in all the code channels, sum(.) represents an operation for finding a sum of all elements of a vector, abs(.) represents an operation for finding an absolute value, and $b^{(i)}$ represents the combined channel impulse response for the $i^{th}$ code channel in the user code channels, and the code channel activation module is specifically configured to calculate a sum of the correlation between the user code channels by using an equation:

$$AutoCorUser = \left(\sum_{j=1}^{N_{users}} \sum_{i=1}^{N_{users}} Cor(i,j)\right) (j=1,2,\ldots,N_{users})$$

and use $AutoCorUser/N_{user}$ as a first calculation result, wherein $Cor(i,j)$ represents the correlation between the $i^{th}$ code channel and the $j^{th}$ code channel in the user code channels.

10. The code channel activation device according to claim 9, further comprising:
a joint detection module, configured to perform joint detection on the activated code channels.

11. The code channel activation device according to claim 10, wherein
the code channel activation module is specifically configured to calculate the correlation WinCor(m) between the interference code channels within the $m^{th}$ window $Win_m$ and the user code channels by using an equation:

$$WinCor(m) = \sum_{l \in Win_m} \sum_{i=1}^{N_{users}} Cor(i,l),$$

use WinCor(m)/CodeNum(m) as a second calculation result,
if WinCor(m)/CodeNum(m) > $\alpha$* $AutoCorUser/N_{user}$, activate the interference code channels within the $m^{th}$ window $Win_m$, and
if WinCor(m)/CodeNum(m) <= $\alpha$* $AutoCorUser/N_{user}$, not activate the interference code channels within the $m^{th}$ window $Win_m$,
wherein Cor(i,l) represents the correlation between the $i^{th}$ code channel in the user code channels and the $l^{th}$ code channel in all the interference code channels, CodeNum(m) represents the number of the interference code channels in the $m^{th}$ window, and a represents a given threshold.

12. The code channel activation device according to claim 7, wherein the code channel activation module is specifically configured to perform the code channel activation according to the correlation results and the power of each code channel.

13. A non-transitory storage medium storing the computer program including instructions, wherein the instructions are executed by a processor so that the processor:
calculates correlations between a set of code channels and user code channels to obtain correlation results, wherein the set of code channels includes the user code channels and interference code channels; and
performs code channel activation according to the correlation results, reserving code channels of a first kind and discarding code channels of a second kind;
wherein the code channels of the first kind including more information than the code channels of the second code channel.

14. The non-transitory storage medium according to claim 13, wherein the instructions are further executed by the processor so that the processor:
calculates correlations between the set of code channels and the user code channels by:
generating combined channel impulse responses for the interference code channels on which code channel activation is to be performed and combined channel impulse responses for the user code channels; and
calculating the correlations between the set of code channels and the user code channels according to the generated combined channel impulse responses, and
performs code channel activation according to the correlation results by:
obtaining a first calculation result according to the correlation between the user code channels;
obtaining a second calculation result according to the correlations between the set of code channels and the user code channels; and
activating the interference code channels on which code channel activation is to be performed when a ratio of the second calculation result to the first calculation result is greater than a threshold, and otherwise, not activating the interference code channels on which code channel activation is to be performed.

15. The non-transitory storage medium according to claim 14, wherein the instructions are further executed by the processor so that the processor:
generates combined channel impulse responses for the interference code channels on which code channel activation is to be performed and combined channel impulse responses for the user code channels by:
generating the combined channel impulse responses for the interference code channels on which code channel activation is to be performed and the combined channel impulse responses for the user code channels by using an equation:

$$b^{(k)} = \left(b_1^{(k)}, b_2^{(k)}, \ldots, b_{Q+W-1}^{(k)}\right)$$
$$= (c^{(k)}.*m^{(k)}) \otimes h^{(k)}$$
$$= \left(\left(c_1^{(k)}, c_2^{(k)}, \ldots, c_Q^{(k)}\right).*\left(m_1^{(k)}, m_2^{(k)}, \ldots, m_Q^{(k)}\right)\right) \otimes$$
$$\left(h_1^{(k)}, h_2^{(k)}, \ldots, h_W^{(k)}\right)$$

wherein $b^{(k)}$ represents the combined channel impulse response of the $k^{th}$ code channel in all the code channels consisting of the interference code channels and the user code channels received by the terminal, k is an integer and k=1, 2, . . . , $N_{users}$+1, $N_{users}$+2, . . . , $CH_v$, $N_{users}$ represents the number of user code channels, $CH_v$ represents the total number of the code channels, $c^{(k)}$ represents a spreading code corresponding to the $k^{th}$ code channel, $m^{(k)}$ represents a scrambling code corresponding to the $k^{th}$ code channel, $h^{(k)}$ represents the channel impulse response corresponding to the $k^{th}$ code channel, .* represents a symbol for point multiplication, $\otimes$ represents a symbol for linear convolution, Q represents a spreading factor, and W represents a window length for the channel impulse response, calculates the correlation between the interference code channels on which code channel activation is to be performed and the user code channel, and the correlation between the user code channels according to the generated combined channel impulse responses by:

calculating the correlation between the interference code channels on which code channel activation is to be performed and the user code channel, and the correlation between the user code channels according to the generated combined channel impulse responses by using an equation:

$Cor(i,k) = abs(sum(b^{(i)} .* b^{(k)*})), i=1,2, \ldots, N_{users}$ wherein $Cor(i,k)$ represents the correlation between the $i^{th}$ code channel in the user code channels and the $k^{th}$ code channel in all the code channels, sum(.) represents an operation for finding a sum of all elements of a vector, abs(.) represents an operation for finding an absolute value, and $b^{(i)}$ represents a combined channel impulse response for the $i^{th}$ code channel in the user code channels, and obtains a first calculation result according to the correlation between the user code channels by:

calculating a sum of the correlation between the user code channels by using an equation:

$$AutoCorUser = \left( \sum_{j=1}^{N_{users}} \sum_{i=1}^{N_{users}} Cor(i,j) \right) \quad (j = 1, 2, \ldots, N_{users})$$

and using $AutoCorUser/N_{user}$ as the first calculation result, wherein $Cor(i, j)$ represents the correlation between the $i^{th}$ code channel and the $j^{th}$ code channel in the user code channels.

16. The non-transitory storage medium according to claim 15, wherein the instructions are further executed by the processor so that, subsequent to the code channel activation, the processor:
performs joint detection on the activated code channels.

17. The non-transitory storage medium according to claim 16, wherein the instructions are further executed by the processor so that the processor:

obtains a second calculation result according to the correlation between the interference code channels on which code channel activation is to be performed and the user code channel by:

calculating the correlation WinCor(m) between the interference code channels within the $m^{th}$ window $Win_m$ and the user code channels by using an equation:

$$WinCor(m) = \sum_{l \in Win_m} \sum_{i=1}^{N_{users}} Cor(i,l),$$

and using WinCor(m)/CodeNum(m) as the second calculation result, wherein Cor(i,l) represents the correlation between the $i^{th}$ code channel in the user code channels and the $l^{th}$ code channel in all the interference code channels, and CodeNum(m) represents the number of the interference code channels in the mth window, and activates the interference code channels on which code channel activation is to be performed when a ratio of the second calculation result to the first calculation result is greater than a threshold, and otherwise, not activating the interference code channels on which code channel activation is to be performed by:

if $WinCor(m)/CodeNum(m) > \alpha * AutoCorUser/N_{user}$, activating the interference code channels within the $m^{th}$ window $Win_m$, and if $WinCor(m)/CodeNum(m) <= \alpha * AutoCorUser/N_{user}$, not activating the interference code channels within the $m^{th}$ window $Win_m$, wherein $\alpha$ represents a given threshold.

18. The non-transitory storage medium according to claim 13, wherein the instructions are further executed by the processor so that the processor performs code channel activation according to the correlation results by:

performing code channel activation according to the correlation results and the power of each code channel.

* * * * *